July 27, 1937. W. H. FRANK ET AL 2,088,105
ELECTRICAL DISTRIBUTION SYSTEM
Filed Sept. 24, 1934 3 Sheets-Sheet 1

INVENTORS.
William H. Frank
Joseph W. Harper
BY Daniel G. Cullen.
ATTORNEY.

July 27, 1937.  W. H. FRANK ET AL  2,088,105
ELECTRICAL DISTRIBUTION SYSTEM
Filed Sept. 24, 1934  3 Sheets-Sheet 3
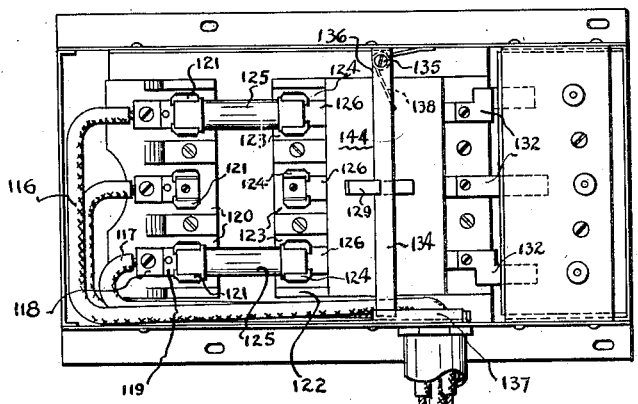
Fig. 4
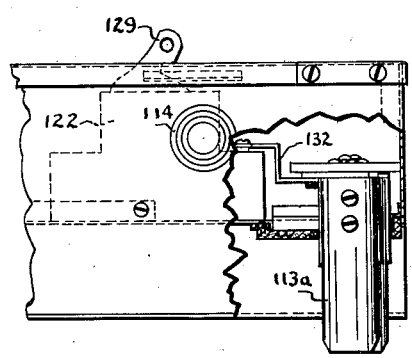
Fig. 5
Fig. 6
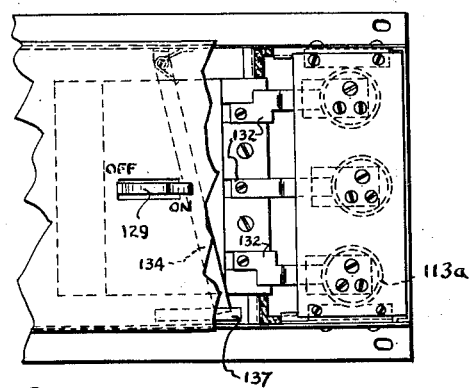
Fig. 7
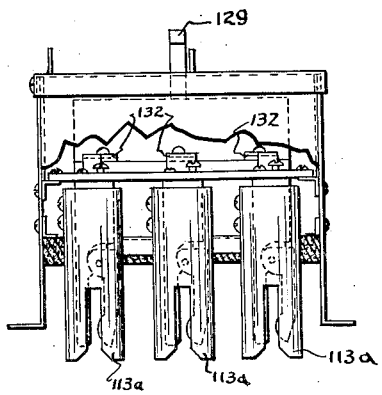
Fig. 8
INVENTOR.
William H. Frank
& Joseph W. Harper
BY Daniel G. Cullen
ATTORNEY.

Patented July 27, 1937

2,088,105

UNITED STATES PATENT OFFICE 2,088,105

ELECTRICAL DISTRIBUTION SYSTEM

William H. Frank and Joseph W. Harper, Detroit, Mich., assignors to Bulldog Electric Products Company, Detroit, Mich., a corporation of West Virginia Application September 24, 1934, Serial No. 745,300

5 Claims. (Cl. 247—3)

This application relates to bus duct type electrical distribution systems and more particularly relates to a novel current take-off means used in connection with bus ducts.

The objects and features of the inventions of this case will be more specifically described at a later stage of this specification, for an understanding of which reference may be had to the appended drawings, which show an embodiment of these inventions.

In these drawings,

Fig. 4 shows it in top plan view with the cover removed for purposes of clarity;

Fig. 5 shows a detail of the handle locking means;

Fig. 6 is a fragmentary side view of the safety switch plug, particularly showing the plug contacts;

Fig. 7 shows the same in fragmentary top plan view; and

Fig. 8 shows the same in fragmentary end view.

Figure 1:
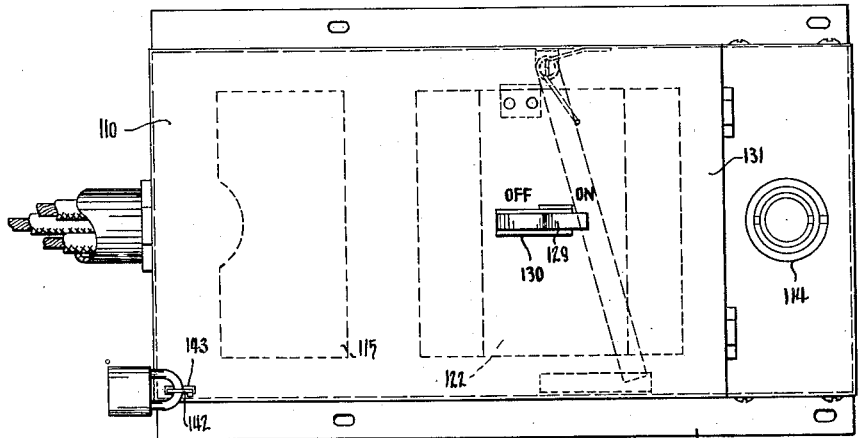
Fig. 1 shows a safety switch plug in top plan view.
Figure 2:
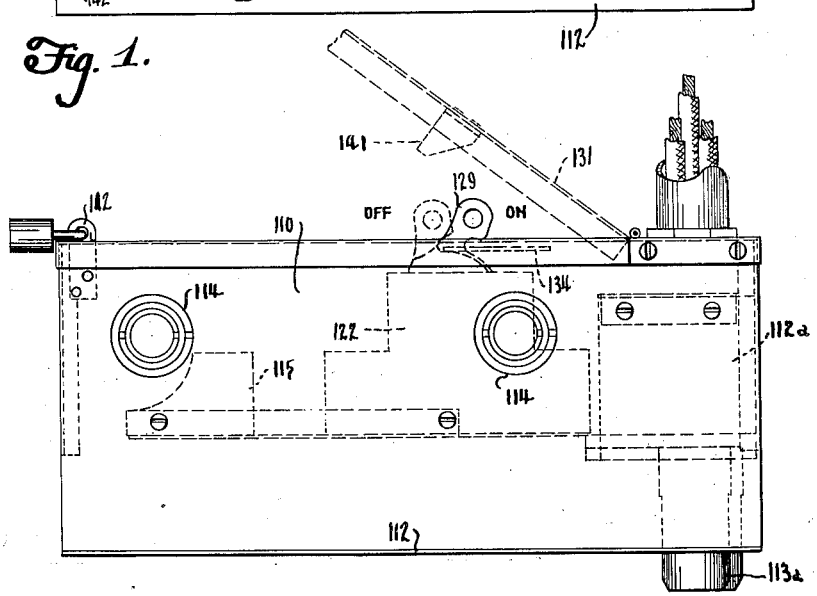
Fig. 2 shows it in side view.
Figure 3:
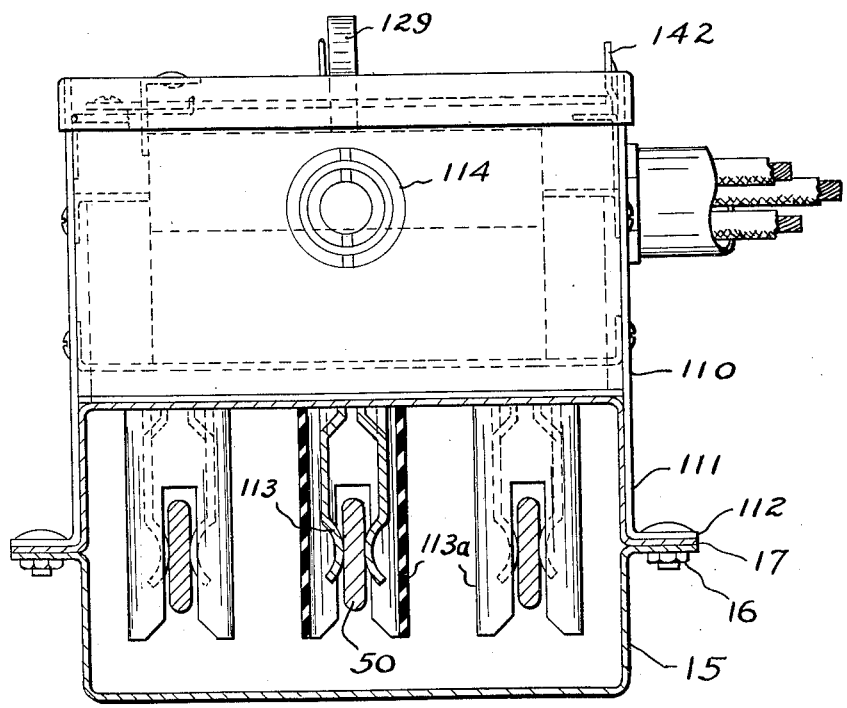
Fig. 3 shows it in end view and on a duct.

In Figs. 1–8 there is shown a plug which is in the nature of a safety switch plug, the plug having an externally accessible handle for operating the within-contained safety switch parts for switching operation; connector and contact details thereof are also shown.

The safety switch plug comprises a sheet metal plug box 110 having an open bottom and sides provided with downwardly extending portions 111 for embracing the sides of the duct 15 with which the plug is to be associated for guiding and grounding purposes, these portions having flanges 112 for engaging the duct flanges 17, whereby the duct bolts 16 may be utilized to secure the safety switch plug in place on the duct.

Disposed within the plug box at one end thereof is a contact block 112a having downwardly projecting contacts or prongs 113 for engagement with the bus bars 50 of the bus duct, the contacts being shielded by tubes 113a. The box also has knockouts 114 at suitable portions thereof for admitting branch circuit cables into the interior of the box, which cables are electrically connected, in the box, to the contacts 113 through a connection block, a fused safety switch of a character about to be described, and the contact block itself.

Disposed within the plug box 110, at the end thereof opposite the contact block 112a is the cable connection block 115 aforesaid to which the branch circuit cables 116 are directly connected, the bared terminals 117 of these cables being fastened, through connectors 118 to straps 119 of the connection block. The straps 119 are contained in individually barriered cells 120 of the connection block and are provided with fuse clips 121.

Also within the box, but between the contact block 112a and the connection block 115 is a switch block 122 having individual cells 123 corresponding in number to the cells 120 of the connection block 115, and these are provided with fuse clips 124 which are connected to the fuse clips 121 of the connection block 115 by conventional fuses 125. The fuse clips 124 of the switch block 122 are mounted on straps 126 which are provided with stationary switch contacts adapted to be electrically connected to other stationary switch contacts on the switch block through the medium of a multipole quick make-and-break switch manipulated by a handle 129 which is accessible externally of the plug, by virtue of the fact that a portion thereof projects through a slot 130 in a hinged cover 131 of the plug box 110. The last-mentioned set of stationary switch contacts are electrically connected by connection straps 132 to the plug contacts 113 of the contact block 112a.

It will thus be seen that the switch can be manipulated for electrically connecting the branch circuit cables 116 to the plug contacts 113 in the intended manner and for the purposes for which the safety switch plug is constructed.

For insuring the safety operation of the switch, that is to say for preventing the switch from being thrown when the cover is open, and for preventing the cover from being opened when the switch is "on", an interlock bar 134 is provided to cooperate with the switch handle. One end of the bar is pivotally mounted at 135 in a lug 136 secured to the side of the box 110, and the other end is disposed in a guide 137 secured to the other side of the box; a spring 138 is wound around the pin at the pivotal axis 135 of the interlock bar for directing the bar towards the switch handle 129 and for urging the bar to be disposed, whenever possible, in a slot 139 of the handle.

When the cover is open the interlock bar is urged into the slot of the handle and thus prevents the handle from being rotated to "on" position. When the cover is closed, the wedge-shaped lug 141 on the cover displaces the interlock bar from engagement with the handle, allowing free action. Furthermore with the cover closed and with the handle in "on" position, a portion of the handle overlies a portion of the cover and prevents the cover from being swung open.

A spring latch 142 projects upwardly from the box through a slot 143 in the cover and cooperates with the cover to hold it latched in closed position, even when the switch handle is in "off" position, the latch being manipulable to permit the cover to be opened when the switch is "off".

The interlock bar is provided with a thin sheet 144 of insulation which overlies a major part of the switch and conceals it, thus insuring against accidental contact with the live side of the switch when fuse removal and insertion is being effected with the cover open.

The handle 129 and the latch 142 are provided with suitable apertures for the reception of padlock bails whereby the switch handle and the switch cover may be locked in place for desired purposes.

Now having described the invention, we therefore claim the following:

1. Electrical distribution systems comprising bus duct runs formed of tubular closed duct runs containing insulatedly mounted naked bus runs and having entrance holes on one of their walls providing access to their bus runs, and elongated branch circuit current take off devices disposed outside the duct run and comprising casings containing contact prongs projecting therefrom and insertable into the duct run through the holes thereof to make contact with the bus runs, and also containing connectors and protective means for branch circuit conductors which enter the devices through walls thereof, the devices having extensions on their side walls cooperating with complementary formations of the duct run sides for detachably securing the devices to the duct run, with the devices disposed outside the duct run, and for guiding the devices into cooperating engagement with the duct runs as they are being moved towards the duct run, the extensions being arranged to meet the duct run before the prongs reach the bus runs and to leave the duct run after the prongs leave the bus runs to ground the devices to the duct run before electrical contact between the contacts and the bus runs is established and to ground the devices to the duct runs after such contact is broken.

2. Electrical distribution systems comprising bus duct runs formed of tubular closed duct runs containing insulatedly mounted naked bus runs and having entrance holes on one of their walls providing access to their bus runs, and elongated branch circuit current take off devices comprising cup shaped casings closed on all sides except one, which one is open, the casings containing contact prongs projecting from their open sides and insertable into the duct run through the holes thereof to make contact with the bus runs, and also containing connectors and protective means for branch circuit conductors which enter the devices through walls thereof, the devices having extensions on their side walls cooperating with complementary formations of the duct run sides for detachably securing the devices to and for guiding the devices into cooperating engagement with the duct runs, the prongs, connectors, and protective means being accessible through the open sides of the devices, normally closed by the adjacent duct run walls and in sealed relation therewith, the extensions being arranged to meet the duct run before the prongs reach the bus runs and to leave the duct run after the prongs leave the bus runs to ground the devices to the duct run before electrical contact between the contacts and the bus runs is established and to ground the devices to the duct runs after such contact is broken.

3. Electrical distribution systems comprising bus duct runs formed of tubular closed duct runs containing insulatedly mounted naked bus runs and having entrance holes on one of their walls providing access to their bus runs, and elongated branch circuit current take off devices comprising cup shaped casings closed on all sides except one, which one is open, the casings containing contact prongs projecting from their open sides and insertable into the duct run through the holes thereof to make contact with the bus runs, and also containing connectors and protective means for branch circuit conductors which enter the devices through walls thereof, the devices having extensions on their side walls cooperating with complementary formations of the duct run sides for detachably securing the devices to and for guiding the devices into cooperating engagement with the duct runs, the prongs, connectors, and protective means being accessible through the open sides of the devices, normally closed by the adjacent duct run walls and in sealed relation therewith, the extensions being arranged to meet the duct run before the prongs reach the bus runs and to leave the duct run after the prongs leave the bus runs to ground the devices to the duct run before electrical contact between the contacts and the bus runs is established and to ground the devices to the duct runs after such contact is broken, the devices having switching means formed as parts thereof whereby the branch circuits may be switched to and from the bus runs even when the devices are supported by the duct runs, and even while their prongs engage the bus bars.

4. Electrical distribution systems comprising bus duct runs formed of tubular closed duct runs containing insulatedly mounted naked bus runs and having entrance holes on one of their walls providing access to their bus runs, and elongated branch circuit current taken off devices comprising cup shaped casings closed on all sides except one, which one is open, the casings containing contact prongs projecting from their open sides and insertable into the duct run through the holes thereof to make contact with the bus runs, and also connectors and protective means for branch circuit conductors which enter the devices through walls thereof, the device having extensions on their side walls cooperating with complementary formations of the duct run sides for detachably securing the devices to the duct runs, the prongs, connectors, and protective means being accessible through the open sides of the devices, normally closed by the adjacent duct run walls and in sealed relation therewith.

5. Electrical distribution systems comprising bus duct runs formed of tubular close duct runs containing insulatedly mounted naked bus runs and having entrance holes one one of their walls providing access to their bus runs, and elongated branch cvircuit current take off devices comprising cup shaped casing closed on all sides except one, which one is open, the casings containing contact prongs projecting from their open sides and insertable into the duct run through the holes thereof to make contact with the bus runs, and also connectors and protective means for branch circuit conductors which enter the devices through walls thereof, the devices having extensions on their side walls cooperating with complementary formations of the duct run sides for detachably securing the devices to the duct runs, the prongs, connectors, and protective means being accessible through the open sides of the devices, normally closed by the adjacent duct run walls and in sealed relation therewith, the devices having switching means formed as parts thereof whereby the branch circuits may be switched to and from the bus runs even when the devices are supported by the duct runs, and even while their prongs engage the bus bars.

WILLIAM H. FRANK.
JOSEPH W. HARPER.